United States Patent Office 3,440,225
Patented Apr. 22, 1969

3,440,225
PROCESS FOR THE MANUFACTURE OF SHAPED STRUCTURES FROM POLYGLYCOLIDES
Wolf B. Sattler, Wolfen, Albert Walter Voss, Dessau-Haideburg, and Hartmut W. G. Wendel, Bitterfeld, Germany, assignors to VEB Filmfabrik Wolfen, Wolfen, Kreis Bitterfeld, Germany
No Drawing. Filed July 29, 1965, Ser. No. 475,867
Int. Cl. C08g 31/06, 17/02
U.S. Cl. 260—78.3          8 Claims

ABSTRACT OF THE DISCLOSURE

To a cyclic glycolide alone or as the predominant constituent of a mixture is added prior to polymerization thereof highly dispersed silicic acid anhydride, a silicic acid ester or a mixture of both; polymerization, shaping of the polymerized product and heating of the shaped product follow.

---

The present invention relates to a process for the manufacture of shaped structures, for example, filaments, from polyglycolides prepared by polymerizing cyclic glycolide or a mixture consisting predominantly of cyclic glycolide.

A process has been proposed for the manufacture of shaped structures from polyglycolides using tin-III-stearate as the polymerization catalyst, the polymerization and the shaping being carried out within a few minutes in a single working stage. Films or filaments obtained in this manner display after the usual after-treatment operations, for example, stretching and shrinking, good mechanical strength and a technically adequate melting range, which is above 200° C. In some cases, especially to facilitate the spinning of filaments on an extruder equipped with spinnerets, it is advantageous to carry out the polymerization using a mixture of the glycolide with about 4 to 5% of lactide (the methyl homologue) instead of with the cyclic glycolide alone.

The resulting polymeric products are insoluble in the usual solvents for organic polymers. So far only a single solvent for the product, trifluoroacetic acid, has been found, so that it is possible to control the degree of polymerization by making viscosimetric measurements on solutions of 1% strength in this solvent. One disadvantage of the shaped polyglycolide structures is that, notwithstanding their insignificant solubility, their stability towards water is unsatisfactory. At elevated temperatures, even below 100° C., and especially in an alkaline medium, there is a rapid and relatively considerable decrease in the mechanical strength.

The present invention provides a process for the manufacture of shaped structures containing polyglycolides which have good stability towards water and a substantial mechanical strength, even at an elevated temperature.

It has been proposed to improve the stability towards water by coating the shaped structure, for example a filament, with a product containing, for example, silicon, such as a silicone, by passing the filament through a polysilicone dissolved in a suitable solvent, or, to ensure better adhesion, by condensing a polysilicone on the filament in a final operation. It will be readily realized that a superficial hydrophobizing treatment is not as effective as a process in which suitable hydrophobizing agents are irreversibly incorporated in the product by condensation in the whole mass of the product. Such processes, however, are difficult to carry out. When an impregnating agent containing silicon is used, a very small amount of the hydrophobizing agent (referred to the weight of the product) suffices so that it is difficult to distribute it as homogeneously as is necessary to achieve the desired effect. When, for example, in the so-called melt-spinning process reactive additives are added to the fiber-forming starting materials before the polymerization or condensation of the components, there is a risk that the condensation or incorporation by condensation of the hydrophobizing agent may occur, under the reaction conditions employed, even before the produce reaches the shaping stage. This means that, for example, the melt viscosity is undesirably increased and renders the spinning operation difficult or even impossible. To overcome such difficulties it has been proposed in the manufacture of linear polyesters by condensation of terephthalic acid and glycol, to add reactive silicic acid anhydride, in an amount of about 2.5% or more (calculated on the weight of the components), after the condensation has reached a certain degree (75% of the total conversion or over). The result was, however, not entirely satisfactory.

It is the object of the present invention to provide an improved process for the manufacture of shaped structures from polyglycolides which avoids the drawbacks of the known methods above outlined and will permit to obtain shaped structures, e.g., filaments, of superior properties, particularly high mechanical stability.

The present invention is based on the observation that water resistant shaped structures can be manufactured from polyglycolides prepared by polymerization of cyclic glycolide, or of mixtures consisting predominantly of cyclic glycolide, using tin-III-stearate as catalyst and by subsequent shaping, by adding to the starting material prior to the polymerization, highly dispersed silicic acid anhydride or/and a silicic acid ester, the amount of silicon added being within the range of 0.01 to 0.8% by weight, calculated on the monomeric starting material, and heating the product obtained after the shaping operation for a period of at least about 30 minutes at a temperature ranging from about 120° to 170° C., preferably at a temperature of about 150° C.

Highly dispersed silicic acid anhydride can be prepared, for example, by hydrolyzing silicon tetrachloride at a very high temperature. Preferred silicic acid esters are the esters of ortho-silicic acid ($H_4SiO_4$) or the so-called condensed esters of silicic acid that can still be distilled. It will be readily understood that the silicic acid ester must not decompose or evaporate from the mixture at the temperatures of slightly above 200° C. used in the polymerization. This requirement is satisfied, for example, by the ortho-silicic acid cyclohexyl ester $Si(OC_6H_{11})_4$ or the condensed silicic acid tetra-n-butyl ester or n-butylsilicate 40 (40 indicates that the product contains 40% of $SiO_2$).

In the process of the invention, the polymerization of the cyclic glycolide is carried out so rapidly that during the polymerization a reaction with the added silicic acid ester or silicic acid anhydride sets in but extensive cross-linking does not occur. Thus, for example, when the ortho-silicic acid ester of cyclo-hexanol is used, a filament issuing from an extruder spinneret is completely soluble in trifluoroacetic acid. The cyclohexyl ester of orthosilicic acid, however, which is readily soluble, for example, in acetone and ethyl acetate, cannot be washed out completely with these solvents from the disintegrated polymeric product. A similar observation has been made with pulverulent, highly dispersed silicic acid anhydride. The polymer issuing from the extruder is completely soluble in trifluoro-acetic acid even though silicic acid anhydride itself is insoluble in it. This would indiciate that extensve cross-linking does not occur at this stage. Such cross-linking would probably also manifest itself in difficulties on shaping, for example in manufacturing filaments by the melt spinning process, but this is not experienced with any of the silicon compounds to be used in the present invention. On the contrary, the spinning operation is found to proceed more smoothly and no baking of the polymers obtained by this invention on to the extruder screw or in the spinning head was observed. When components are used that are free from silicon, such difficulties are almost always experienced.

It is, of course, possible to modify empirically the processing conditions by a suitable choice of the additives depending on the kind and dimensions of the shaped product, for example, fiber or film, to be manufactured; one way of doing this is by combining a silicic acid ester with pulverulent highly dispersed silicic acid anhydride. It is further known that, for example, fibers produced by a melt-spnning process achieve their valuable properties only after a subsequent operation, which is generally attributed to an improvement of the inner orientation, for example of the degree of crystallization. For example, fibers may be stretched, generally at room temperature or at a slightly raised temperature, to a multiple, for example, 3 to 4 times, of their initial length; the relevant optimum temperature and the appropriate degree of stretch must, in general, be determined in each case. The stretching is generally followed by the so-called shrinking operation, that is to say, a short treatment at a temperature only slightly higher than the stretching temperature and under only slightly increased tension. This treatment increases the tear strength substantially. The elongation is reduced, and the mechanical strength and the elongation are adapted to the intended use. Such treatment can also be carried out with shaped products manufactured by the present process.

To improve the technical properties of the shaped polyglycolide products further, the shaped product, in the case of filaments, preferably the stretched and shrunk filament (for example, wound on a spinning bobbin), is heated for at least about 30 minutes at a temperature ranging from about 120° C. to 170° C., preferably of about 150° C. The upper temperature limit should not be exceeded. The heat treatment may last up to about 2 hours; longer treatment times are not harmful, provided the temperature does not exceed 170° C. When this after-treatment has been applied, the shaped products are completely insoluble in trifluoroacetic acid, whereas they are completely soluble immediately after issuing from the spinnerets. This thermal after-treatment further increases the tear strength to reach a maximum value without an attendant drop in elongation. The shaped structures retain their good tear strength even on prolonged storage at an elevated temperature, for example about 160° C. to 170° C., even in contact with atmospheric oxygen. Only after a very long time is a slight drop in tear strength noticeable. Finally, a very good stability towards water is attained, both in the acid and in the alkaline range. This stability towards hydrolytic attack is easiest to test by measuring the tear strength. The values found after storage in water for up to 200 hours display a surprising constancy, and a drop is noticed only after an even longer storage time. The good stability towards water of the polymerized and shaped products offers the great advantage that they, preferably in the form of filaments or films, can be stretched and allowed to shrink in water or aqueous solutions of wetting or dressing agents before they are subjected to the heat treatment.

The following examples illustrate the invention. It should, however, be understood that many changes in the details can be made without departing from the spirit of the invention.

EXAMPLE 1

A small, suitably heated screw-type extruder (length of screw 20 mm.) was charged with a mixture of

| Grams | Percent by wt. | Ingredient |
|---|---|---|
| 476.5 | 95.3 | Cyclic diglycolide (acid number 0.20). |
| 20.0 | 4.0 | Cyclic dilactide (acid number 0.10). |
| 2.5 | 0.5 | Tin-II-stearate. |
| 1.0 | 0.2 | Tetracyclohexyl orthosilicate (0.07 g. of Si). |

The screw press was subdivided into three temperature zones (I, II and III) of equal length, and the temperatures of these zones were adjusted as follows:

|  | ° C. |
|---|---|
| Filler socket | 12 |
| Heating zone I | 90 |
| Heating zone II | 140 |
| Heating zone III | 185 |
| Extruder head | 210 |

Filaments were extruded through a steel die having 9 perforations (of 1 mm. diameter), quenched by a current of air and drawn off at a rate of 45 meters per minute with the screw revolving 90 times per minute. The filaments obtained in this manner had a relative viscosity of 2.34 measured in a 1% solution of the polymer in trifluoroacetic acid, a tear strength of 5 Rkm. (kilometers of tear strength) and an ultimate stretch of over 100%. The filaments were stretched in water at 52° C. with a contact length of 25 cm. over an agate mandrel in the ratio of 1:3, and the filament so stretched had a tear strength of 24 Rkm. and an ultimate stretch of 53%, with the relative viscosity dropping to 2.30. The filament was then allowed to shrink in a vat (length of contact 165 cm.) in water heated at 72° C. while being further stretched at a ratio of 1:1.5, whereupon the tear strength rose to 35 Rkm. and the ultimate elongation dropped to 35%. The filament stretched and shrunk in this manner was then heated on a bobbin for 1 to 2 hours at 150° C., and its tear strength was further improved to a value of 50 Rkm. for an ultimate elongation of 25%. The filament had now reached its maximum orientation and had become insoluble in trifluoroacetic acid.

The stretched, shrunk and heat-treated filament was then stored in a drying cabinet at 150° C. or in water at 30° C., and the drop in its tear strength with time was then determined in the following manner:

(a) Heat treatment in air

From an initial value of 34 Rkm. and 22% elongation the tear strength rose over a period of 85 hours to 38 Rkm. After a heat treatment of 175 hours at 150° C. in a drying cabinet the tear strength was still 70% of the initial value and the elongation was 13%. From an initial value of 18 Rkm. and 5% elongation the tear strength dropped after 350 hours to 53% of the initial value.

(b) Water treatment at different pH values

On being kept in an aqueous acid solution (pH=2.4) the filaments retained the initial value of 30 Rkm. for 200 hours without change. The ultimate elongation was 20%. After a prolonged treatment of 360 hours the tear strength was still 80% and after 600 hours still 60% of the initial value. After having been kept for 400 hours in aqueous alkali (pH=11.7) the filaments still retained 80% and after 600 hours still 70% of their initial tear strength.

EXAMPLE 2

The extruder described in Example 1 was charged with a mixture of the following ingredients:

| Grams | Percent by wt. | Ingredient |
|---|---|---|
| 470.0 | 94.0 | Cyclic diglycolide. |
| 20.0 | 4.0 | Cyclic dilactide. |
| 7.5 | 1.5 | Tetra-n-butoxy siloxane (1.4 g. of Si) (commercial product, trademark: n-Butylsilicate 40). |
| 2.5 | 0.5 | Tin-II-stearate. |

The temperatures of the different heating zones were adjusted to:

|  | ° C. |
|---|---|
| Filler socket | 12 |
| Heating zone I | 80 |
| Heating zone II | 130 |
| Heating zone III | 190 |
| Extruder head | 200 |

The extruded filaments were quenched with an annular jet of air and drawn off at a rate of 10 meters per minute with the screw revolving 60 times per minute. The relative viscosity was 1.65. The filaments were stretched in water heated at 52° C. to a ratio of 1:7 and had a tear strength of 13 Rkm. which during shrinking in water at 75° C. rose to 26 Rkm. By the treatment in the drying cabinet at 120° C. the maximum mechanical strength of 30 Rkm. at an ultimate elongation of 20% was attained.

EXAMPLE 3

The extruder was charged with the following mixture under the conditions described in Example 1:

| Grams | Percent by wt. | Ingredient |
|---|---|---|
| 473.75 | 94.75 | Cyclic diglycolide (acid number 0.20). |
| 20.0 | 4.0 | Cyclic dilactide (acid number 0.10). |
| 2.5 | 0.5 | Tin-II-stearate. |
| 3.75 | 0.75 | Highly dispersed silicic acid anhydride (1.75 g. of Si). |

Further working up was carried out as in Example 1. The relative viscosity of the extruded filaments was 2.12, and their tear strength after the heat treatment amounted to 45 Rkm. Their stability towards dry heat and on storing in water was approximately the same as the filaments produced in Example 1.

EXAMPLE 4

The extruder described in Example 1 was charged with a mixture of:

| Grams | Percent by wt. | Ingredient |
|---|---|---|
| 474.0 | 94.8 | Cyclic diglycolide (acid number 0.20). |
| 20.0 | 4.0 | Cyclic dilactide (acid number 0.10). |
| 2.5 | 0.5 | Tin-II-stearate. |
| 2.5 | 0.5 | Highly dispersed silicic acid anhydride (1.17 g. of Si). |
| 1.0 | 0.2 | Tetra-cyclohexyl orthosilicate (0.07 g. of Si). |

Further working up was carried out as described in Example 1. The relative viscosity of the extruded filaments was 2.38 and their strength after the heat treatment was 48 Rkm. The stability during storage in water or dry at an elevated temperature was substantially as described in Example 1.

EXAMPLE 5

A mixture of 70 g. of glycolide (acid number 0.20), 0.355 g. of tin-II-stearate, 0.355 g. of highly dispersed silicic acid anhydride and 0.142 g. of cyclohexyl orthosilicate—all these ingredients being in the pulverulent stage—prepared in a mixer was introduced into a cylindrical mold and polymerized in it. Polymerization set in at 165° C. After a few minutes the melt reached a temperature of 200° C. to 210° C. and was then slowly cooled. The moldings thus obtained were insoluble in the usual organic solvents.

After having been tempered for 120 minutes at 120° C. the cylindrical moldings thus obtained had a tensile strength from 900 to 950 kiloponds per square centimeter. The compressive strength of the specimens was 2,200 to 3,000 kiloponds per square centimeter. These values were still unchanged even after several days immersion in water.

What we claim is:

1. In a process for the manufacture of a shaped product from a polyglycolide, wherein cyclic glycolide or a mixture consisting predominantly of cyclic glycolide is polymerized, with the use of tin-II-stearate as catalyst, the improvement which comprises adding to the cyclic glycolide or the mixture consisting predominantly of the cyclic glycolide before polymerization thereof a compound selected from the group consisting of highly dispersed silicic acid anhydride, silicic acid ester, and a mixture of both, the amount of silicon added being about 0.01 to 0.8% by weight, calculated on the monomeric starting material, shaping the polymerized product and heating the resulting shaped products for at least 30 minutes at a temperature within the range of 120° C. to 170° C.

2. A process as claimed in claim 1, wherein the silicic acid ester is an orthosilicic acid ester or a condensed ester of silicic acid that can still be distilled.

3. A process as claimed in claim 2, wherein the silicic acid ester is orthosilicic acid cyclohexyl ester, condensed silicic acid tetra-n-butyl ester or n-butyl silicate 40.

4. A process as claimed in claim 1, wherein the shaped product is a filament or a film.

5. A process as claimed in claim 4, wherein the shaped product is stretched and allowed to shrink in water or in an aqueous solution of wetting or dressing agent before being subjected to the heat treatment.

6. A process as claimed in claim 1, wherein the heat treatment is carried out at a temperature of substantially 150° C.

7. A process as claimed in claim 1, wherein the heat treatment is carried out for a period of up to two hours.

8. A shaped product of a polyglycolide when produced by a process as claimed in claim 1.

References Cited

UNITED STATES PATENTS 2,668,162    2/1954    Lowe _____ 260—78.3

FOREIGN PATENTS 988,939    4/1965    Great Britain.

WILLIAM H. SHORT, Primary Examiner.

L. L. LEE, Assistant Examiner.

U.S. Cl. X.R.

264—178, 210, 290